United States Patent Office 2,919,696
Patented Jan. 5, 1960

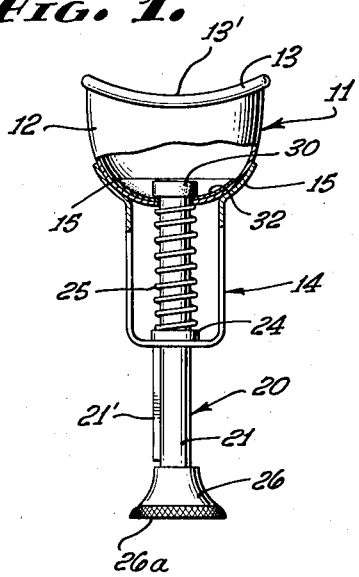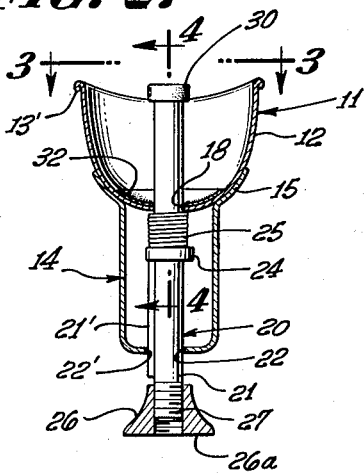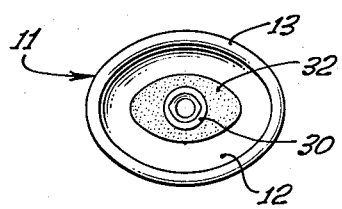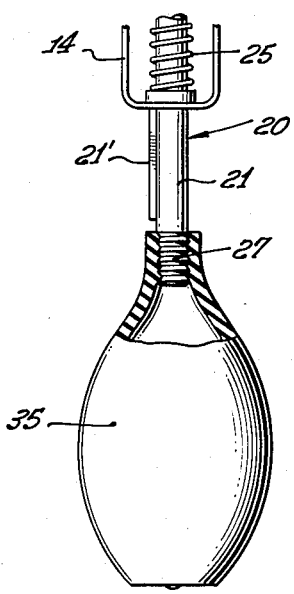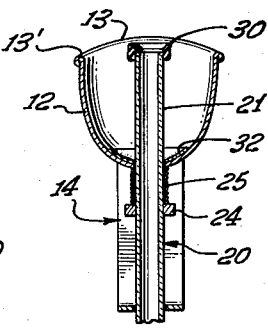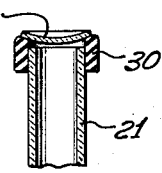
AUGUST RINALDY, INVENTOR.

2,919,696

INSTRUMENT FOR APPLYING CONTACT LENSES

August Rinaldy, Los Angeles, Calif.

Application April 4, 1958, Serial No. 726,400

10 Claims. (Cl. 128—303)

This invention has to do with an instrument for applying a contact lens to the eye.

Great difficulty is experienced by the users of contact eye lenses in applying the lenses to the eyes since considerable skill is required to place the lenses in proper position. Much of the difficulty is caused by such factors as: the small size of the lenses which makes them difficult to see and to handle; the poor vision of the users without the lenses; the irritation to the eyes; and the lack of a suitable instrument for the purpose. Heretofore it has been customary in applying the lenses, for the user to bend over so that the eyes are facing downward and then to apply the lens, which is supported upon one finger of one hand, to the eye while at the same time the eyelids are held apart by the other hand of the person. This is not easy, particularly for the novice.

An object of the present invention is to provide a novel instrument which greatly simplifies the application of a contact lens to the eye, making this a relatively easily accomplished operation, and one which can be readily performed by a novice who is just undertaking to wear this type of lens. It is also an object to provide such an instrument which can be used for removing a lens from the eye.

A further object is to provide a device having a cup-like portion adapted to be manipulated for the purpose of holding the eyelid and skin adjacent the eye to one side to enable the application of a lens to the eye and to provide means for holding the lens itself in proper relation to the eye so that it may be readily applied to the eye. In this connection it is an object to provide a device which enables the user to actually look through the lens being applied during and prior to application thereof to the eye, thereby to enable the person to properly orient the lens as it is being applied.

Still another object is to provide a device of the type indicated which can be used to wash or irrigate the eye.

Another object is to provide a simple device which may be economically manufactured for sale at a relatively inexpensive price.

These and other objects will be apparent from the drawing and the following description. Referring to the drawing:

Fig. 1 is an elevational view of a device embodying the invention, partially broken away;

Fig. 2 is a sectional view of the device of Fig. 1, but showing the lens-supporting member in raised position;

Fig. 3 is a plan view on line 3—3 of Fig. 2;

Fig. 4 is a sectional view on line 4—4 of Fig. 2;

Fig. 5 is a fragmentary sectional view of the upper end of the lens-supporting member; and Fig. 6 is a fragmentary sectional view of the lower end portion of the device of Fig. 1 showing a bulb applied thereto.

More particularly describing the invention, numeral 11 generally indicates a cup member which has a body 12 shown as formed of metal with a bead or rim 13 at its edge. The cup member is substantially in the shape of a conventional eye cup having a somewhat recessed edge portion 13' at each side and the cup itself being elongated in one direction.

A bracket 14, shown as comprising a U-shaped strip of metal, is attached to the cup at regions 15 as by welding, brazing or other conventional means (not shown). The bottom of the cup is apertured at 18 to accommodate a lens-supporting element 20 which includes a tube 21. The latter extends for axial movement through the aperture 18 of the cup and through a guide opening 22 in the bracket 14. This tube is preferably open from end to end to enable a person to see therethrough as will later appear. The tube is fitted with a collar 24 secured thereto and between the collar and the bottom of the cup I provide a compression coil spring 25 which serves to move the tube to the position in which it is shown in Fig. 1. The lower end of the tube is fitted with a nut or the like designated 26 which is removably mounted upon a threaded end portion 27 of the tube. The member 26 provides a relatively large flat outer end surface 26a normal to the axis of the tube upon which the device may be stood upright. Also, member 26 may be relatively heavy for the same purpose, and, in this connection, if desired, the cup, bracket and tube may be made of a plastic and need not be metal as shown.

The upper end of the tube is provided with a rubber-like annular cushion member or ring 30 which extends above the tube 21 as best shown in Fig. 5. The purpose of this is to support the contact lens, designated L, and hold it until it is finally applied to the eye. Preferably the interior of the base of the cup is relatively dark or non-reflective and for this purpose has been shown provided with a dark cloth, such as felt or the like, designated 32, to increase the visibility of a lens on the upper end of the tube.

If desired, means may be provided for preventing relative rotation between the tube 21 and the remainder of the device, as by providing a rib 21' on the tube which is slidably received in a radial recess 22' in the opening 22.

In the use of the device the lens L is placed upon the upper end of the tube so that it rests on the ring 30 of the lens-supporting element 20. The user bends over so that the eyes face downwardly, and in this position the cup portion of the device is brought against the eyelids and manipulated to retract the skin around the eye exposing a large area of the eye. After this has been accomplished the member 20 is moved upwardly against the force of the spring 25 to position the lens L against the eye. During this operation the user can see through the tube 21 and this feature enables the user to correctly orient the lens L over the eye.

In place of the member 26 it may be desirable to utilize a syringe or bulb 35 which may be threaded upon the lower end of the tube 21. When this is done, the tube and the remaining portions of the device may be used to wash or irrigate the eye. Also, with the bulb 35 attached the instrument may be used for removing a lens from the eye by manipulating the bulb in a manner to create a suction in the tube 21 after the lens ring 30 has been placed against a lens in place on the eye.

While I have shown and described a preferred form of my invention, I contemplate that various changes and modifications can be made therein without departing from the scope of the invention as indicated by the following claims.

I claim:

1. An instrument for applying a contact lens to the eye, comprising a cup member adapted to be placed with its edge against the skin surrounding the eye, and a lens-supporting element movable axially of the cup and including a part within the cup for receiving the lens.

2. A device as set forth in claim 1 in which said lens-supporting element is an open-ended tube.

3. A device as set forth in claim 1 in which said lens-supporting element is elongated and transparent through its center from end to end.

4. An instrument for applying a contact lens to the eye, comprising a cup member adapted to be placed with its edge against the skin surrounding the eye, and a tube mounted in said cup centrally thereof for axial movement, the inner end of said tube being adapted to support a lens to be applied to the eye.

5. An instrument for applying a contact lens to the eye, comprising a cup member adapted to be placed with its edge against the skin surrounding the eye, a tube mounted in said cup centrally thereof for axial movement, the inner end of said tube being adapted to support a lens to be applied to the eye, spring means between said cup and said tube urging said tube in a direction to cause the inner end of said tube to be lowered in the cup, and means carried in part by said cup member and in part by said tube limiting movement of said tube relative to the cup.

6. A device as set forth in claim 5 in which the outer end of said tube is provided with an enlargement providing a flat suface normal to the axis of the tube upon which the device may be stood upright upon a supporting surface.

7. A device as set forth in claim 5 in which the tube is open-ended.

8. A device as set forth in claim 5 in which the inner end of the tube is fitted with a cushion ring to support the lens.

9. A instrument for applying a contact lens to the eye, comprising a cup member adapted to be placed with its edge against the skin surrounding the eye, and a tube mounted in said cup centrally therefor for axial movement, the inner end of said tube being adapted to support a lens to be applied to the eye, the bottom interior portion of said cup being provided with a poorly reflective surface surrounding said tube.

10. An instrument for applying a contact lens to the eye, comprising an eye cup, a tube extending centrally through the bottom of the cup for axial movement relative thereto, the inner end of said tube being constructed and arranged to support a lens to be applied to the eye, a bracket on the exterior of said cup supporting said tube for said axial movement, spring means carried on said tube and bearing against said cup for urging said tube outwardly through the bottom of the cup, interengaging means on said bracket and said tube for preventing rotation of the tube, and means carried in part by said cup, in part by said bracket and in part by said tube for limiting axial movement of said tube relative to the cup.

References Cited in the file of this patent

UNITED STATES PATENTS 1,557,620   Robinson _____ Oct. 20, 1925

FOREIGN PATENTS 143,515   Sweden _____ Dec. 29, 1953

OTHER REFERENCES

Bier: Contact Lens Routine and Practice, London, 1953, page 132.